E. S. RICHARDS.
Grain Weighing and Transferring Apparatus.
No. 226,108 — Patented Mar. 30, 1880.
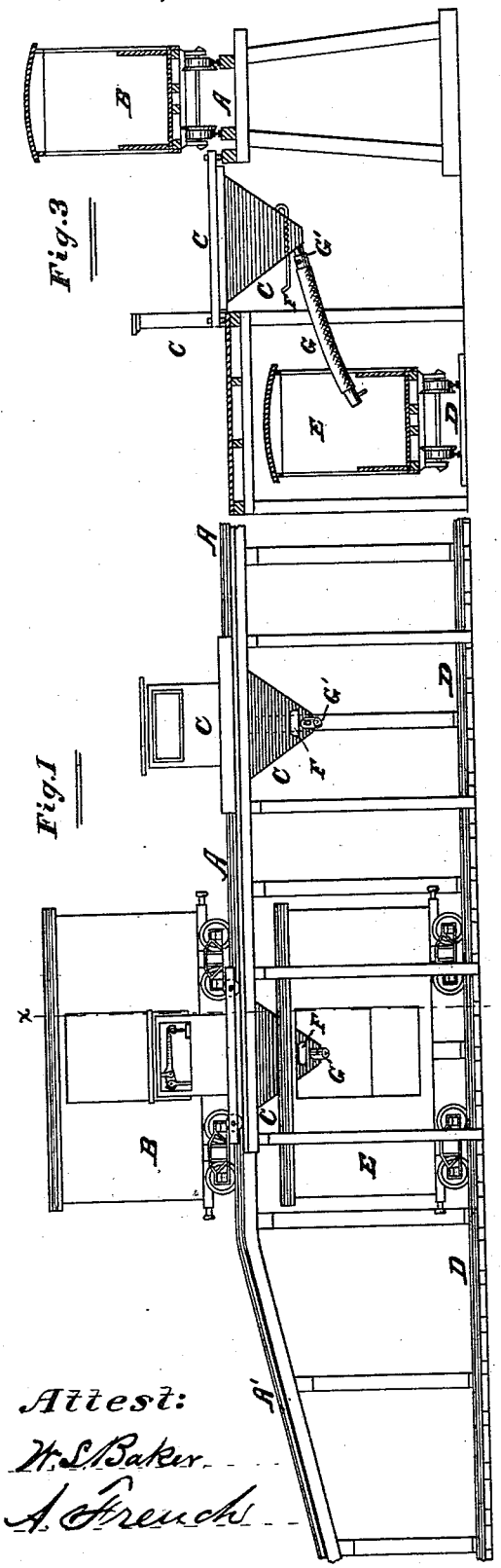
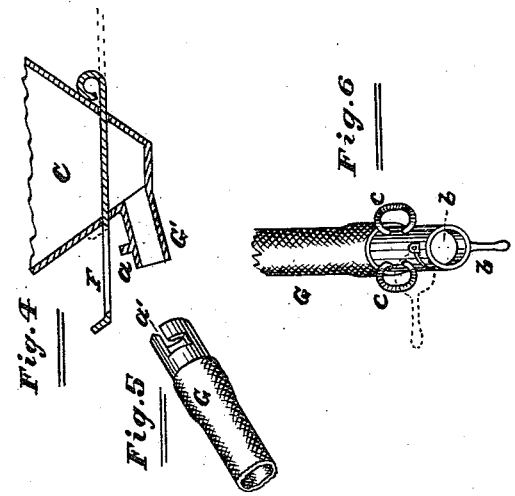
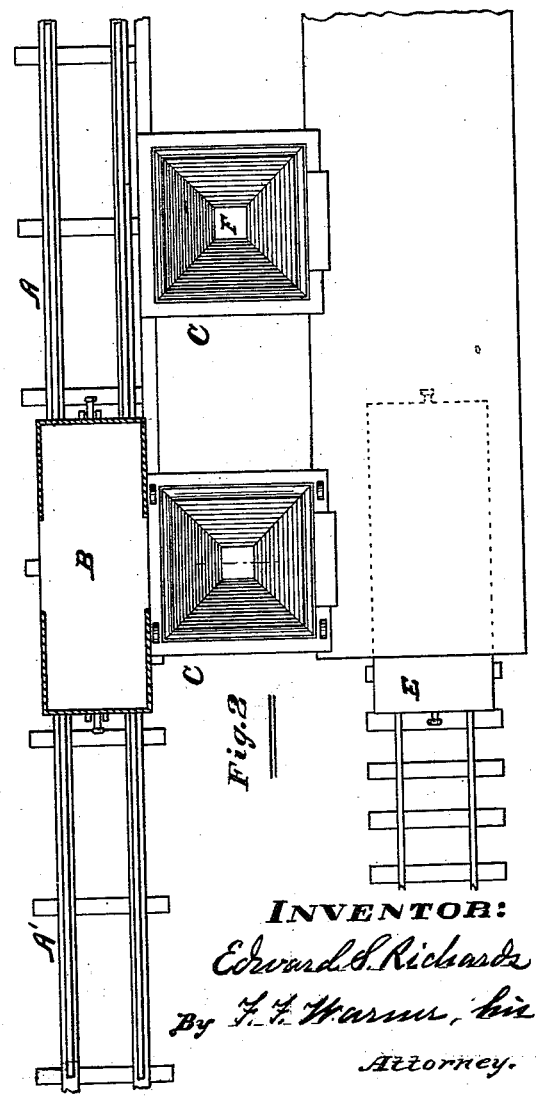
Attest:
W. L. Baker
A. French
INVENTOR:
Edward S. Richards
By F. F. Warner, his Attorney.

UNITED STATES PATENT OFFICE.

EDWARD S. RICHARDS, OF CHICAGO, ILLINOIS.

GRAIN WEIGHING AND TRANSFERRING APPARATUS.

SPECIFICATION forming part of Letters Patent No. 226,108, dated March 30, 1880.

Application filed January 21, 1880.

*To all whom it may concern:*

Be it known that I, EDWARD S. RICHARDS, of Chicago, in the county of Cook and State of Illinois, have invented certain new and useful Improvements in Grain Weighing and Transferring Apparatus, of which the following, in connection with the accompanying drawings, is a specification.

My invention relates to the means employed for weighing grain in bulk, and has for its object the production of simple means whereby the operation referred to may be performed with greater accuracy and facility than heretofore; and to that end my invention consists in the employment of an elevated way having an inclined approach, in connection with one or more hopper-scales, and a way arranged to conduct vehicles to a convenient position for receiving the contents of the scales, all substantially as hereinafter more fully set forth.

In the drawings, Figure 1 is a side elevation of an inclined elevated way, of hopper-scales, and a groundway, arranged with relation to each other in a manner to embody my invention. Fig. 2 is a top or plan view of the same. Fig. 3 is an end view thereof; and Figs. 4, 5, and 6 are details of the means employed in connection with the discharge of the grain.

A represents an elevated way having an inclined approach, A', and B is a grain-car thereon. C C are hopper-scales, also elevated, and arranged, as shown, to receive the contents of the car with facility when the grain-door is opened for the discharge of the grain, and so that the grain which is not discharged by gravity may be easily shoveled into the hopper of the scale. In other words, the hopper is arranged on a plane with or a little below the floor of the car containing the grain to be weighed when the car is on the level or horizontal part of the way A.

To facilitate the discharge of the grain from the car into the hopper, the level or horizontal part of the way A may be inclined so as to tilt the car toward the hopper for that purpose, that side of the way next to the hopper being lower than the other side, and this inclination of the way A may be produced either by making a portion of the way permanently so inclined, or by making sections of it tilting in any suitable way for the same purpose. The grain which does not pass by gravity alone from the car into the hopper may be shoveled out or discharged in any suitable way.

Any number of hopper-scales may be employed which may be used to advantage in connection with the same elevated way, and these scales may either be fixed or movable, and when movable should be mounted on rollers, for which a suitable way or track should be provided. By this means the grain to be weighed may be weighed accurately in bulk and independently of the car, or vehicle by means of which it is conveyed to the scale, and the weighing of the car while containing the grain and again after the grain is discharged therefrom and a computation of the difference in weight in order to ascertain correctly the weight of the grain are rendered unnecessary. Besides this, in weighing grain by my method no allowance need be made on account of foreign matter, such as snow, ice, or moisture, carried by the car containing the grain to be weighed.

D is a ground track or way, and E is a car or vehicle thereon to receive the grain discharged from the hopper-scales. The way D is enough lower than the way A to permit the grain to pass out from the bottom of the hopper of the scale through a discharge tube or trough into the car E by the gravitation of the grain when the discharge thereof therefrom is permitted.

F is a sliding valve in the bottom of the hopper of the scale, for the purpose of confining the grain in the hopper until the weight of the grain therein is ascertained, and the weight may be ascertained by balancing the index-bar in the usual manner. This slide may be regulated in any suitable way, or any well-known shut-off may be employed in its stead.

G is a flexible tube which I employ, by preference, for conducting the grain from the hopper into the receiving-car, as such a tube permits the distribution of the grain evenly with facility without the aid of shovels. For the purpose of admitting of easy connection and disconnection of the tube G and the hopper, I provide the latter with a tubular spout or projection, G', having thereon a small pin or stud, $a$, and in the butt of the tube G I make a rectangular notch, $a'$. In other words, I would suggest what is known as the "lantern" coupling as a good means for making the connection referred to. In the tip or nozzle of the spout or tube G should be a cut-off, b, so that the discharge of the grain may be there controlled, especially while filling sacks or barrels; and handles c c may also be applied at or near the tip of the tube G, so that it may be held and moved with certainty and facility; but I do not here intend to restrict myself to any particular means for conducting the grain from the hopper into the receiving car or vehicle, as various suitable well-known means may be employed for that purpose.

It is obvious that the way D need not necessarily be a railway, for the grain may be dumped into wagons as well as into railway-cars. It may also be dumped into canal-boats or other water-craft, in which case the elevated way should be arranged near a water way or channel. It is also obvious that the way D may be arranged directly underneath the way A, instead of in the relative position shown.

All these parts may be covered by a suitable roof, shed, or building.

I am aware that elevated ways having an inclined approach, and also that hopper-scales, are old, and I do not, therefore, here intend to claim either, broadly; but,

Having thus described my invention, what I claim as new, and desire to secure by Letters Patent, is—

The hereinbefore-described means for weighing and transferring grain, and consisting, essentially, of the combination of an elevated way, A, having an inclined approach, A', of a lower or ground way, D, and of one or more hopper-scales, arranged intermediately with relation to the said ways, substantially as hereinbefore specified.

EDWARD S. RICHARDS.

Witnesses:
F. F. WARNER,
CHAS. H. TALLMADGE.